United States Patent
Roux et al.

(10) Patent No.: US 11,279,216 B2
(45) Date of Patent: Mar. 22, 2022

(54) SEALING ELEMENT COMPRISING A COVER STRIP

(71) Applicant: CQLT SAARGUMMI TECHNOLOGIES S.À.R.L., Remich (LU)

(72) Inventors: Sébastien Roux, St-Aubin-Celloville (FR); Philippe Sans, Luisant (FR)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 71 days.

(21) Appl. No.: 16/472,661

(22) PCT Filed: Feb. 8, 2018

(86) PCT No.: PCT/EP2018/000051
§ 371 (c)(1),
(2) Date: Jun. 21, 2019

(87) PCT Pub. No.: WO2018/145810
PCT Pub. Date: Aug. 16, 2018

(65) Prior Publication Data
US 2019/0359044 A1   Nov. 28, 2019

(30) Foreign Application Priority Data
Feb. 13, 2017   (DE) .................... 10 2017 102 755.6

(51) Int. Cl.
*B60J 10/75*   (2016.01)
*B60R 13/04*   (2006.01)
(Continued)

(52) U.S. Cl.
CPC ............... *B60J 10/75* (2016.02); *B29C 45/14* (2013.01); *B60J 10/16* (2016.02); *B60R 13/04* (2013.01);
(Continued)

(58) Field of Classification Search
CPC   B60J 10/16; B60J 10/75; B29C 45/14; B29K 2021/003; B29K 2023/12; B29K 2705/02; B29L 2031/26; B60R 13/04
See application file for complete search history.

(56) References Cited

U.S. PATENT DOCUMENTS 6,103,168 A     8/2000   Kelly
2012/0261933 A1*  10/2012  Sato ..................... B60R 13/04
                                                 296/1.08

(Continued)

FOREIGN PATENT DOCUMENTS

DE          10235220 A1    2/2004
DE      102007059411 A1    7/2009
(Continued)

OTHER PUBLICATIONS

International Search Report, dated May 29, 2018, 2 Pages.
German Search Report, dated Oct. 5, 2017, 7 Pages.

*Primary Examiner* — Gilbert Y Lee
(74) *Attorney, Agent, or Firm* — Lucas & Mercanti, LLP; Klaus P. Stoffel

(57) ABSTRACT

A sealing element including a cover strip, in particular for sealing a window pane at the inlet of a window channel into which the window pane can be retracted. A portion of the sealing element, which portion is to be produced by injection molding, is connected to the cover strip by being molded onto the cover strip. In a corresponding method, the cover strip is preheated such that its shrinkage is matched to the shrinkage of the molded-on material, until the cover strip has cooled down to approximately the ambient temperature.

11 Claims, 1 Drawing Sheet

(51) Int. Cl.
  *B60J 10/16*   (2016.01)
  *B29C 45/14*   (2006.01)
  *B29K 21/00*   (2006.01)
  *B29K 23/00*   (2006.01)
  *B29K 705/02*  (2006.01)
  *B29L 31/26*   (2006.01)

(52) U.S. Cl.
  CPC .... *B29K 2021/003* (2013.01); *B29K 2023/12* (2013.01); *B29K 2705/02* (2013.01); *B29L 2031/26* (2013.01)

(56) References Cited

U.S. PATENT DOCUMENTS

| | | | |
|---|---|---|---|
| 2014/0212621 A1* | 7/2014 | Blottiau | B29C 45/0003 428/99 |
| 2016/0050684 A1 | 3/2016 | Nam | |
| 2016/0257044 A1* | 9/2016 | Schramm | B29C 48/07 |
| 2016/0311141 A1* | 10/2016 | Harada | B60J 10/18 |

FOREIGN PATENT DOCUMENTS

| | | |
|---|---|---|
| DE | 102014119508 A1 | 3/2016 |
| EP | 2318226 B1 | 2/2012 |
| JP | 2011025575 A | 2/2011 |
| JP | 2013116672 A | 6/2013 |
| WO | 2014188004 A1 | 11/2014 |

\* cited by examiner

SEALING ELEMENT COMPRISING A COVER STRIP

The present application is a 371 of International application PCT/EP2018/000051, filed Feb. 8, 2018, which claims priority of DE 10 2017 102 755.6, filed Feb. 13, 2017, the priority of these applications is hereby claimed and these applications are incorporated herein by reference.

BACKGROUND OF THE INVENTION

The invention relates to a sealing element which comprises a cover strip, in particular for sealing a vehicle window pane which can be lowered into a shaft at the shaft inlet. Furthermore, the invention relates to a method for manufacturing a sealing element of this type.

Sealing elements which comprise cover strips conventionally have a sealing strand which is manufactured by way of extrusion from elastomer material and is connected to the cover strip by way of a positively locking connection. A connection of this type requires a high workload and the automation of it is complicated. In addition, it is made difficult as a result of dimensional variations of the parts to be connected. Furthermore, the retaining strength of the positively locking connection can vary in a manner which is dependent on manufacturing tolerances. The extruded strand disadvantageously moves in the strand longitudinal direction relative to the cover strip.

SUMMARY OF THE INVENTION

The invention is based on the object of producing a novel sealing element of the type mentioned at the outset, which novel sealing element can be manufactured with a higher quality and a smaller effort.

The sealing element in accordance with the invention which is to be achieved by way of said object is characterized in that a section of the sealing element, which section is to be manufactured by way of injection molding, is connected to the cover strip by way of being molded onto the cover strip.

The sealing element in accordance with the invention can advantageously be manufactured completely with the cover strip in easily automatable injection molding work operations.

The cover strip is expediently of vessel-shaped configuration with a vessel space which can be filled by way of molding material of the section to be manufactured by injection molding. The molded-on material advantageously fits into the vessel space in a positively locking manner, in particular when the vessel space is undercut in accordance with one advantageous embodiment of the invention.

At its ends, the cover strip preferably has end walls which delimit the vessel space. The molded-on material is thus fixed in a positively locking manner within the vessel space both in the longitudinal direction and in the transverse direction of the cover strip.

In a further refinement of the invention, the section which is to be manufactured by way of injection molding is configured as a composite part from a thermoplastic and an elastomer, in particular a thermoplastic elastomer. A hard thermoplastic material, such as PP, and a soft elastomer material are particularly preferred.

Whereas a thermoplastic part of the section to be manufactured by way of injection molding expediently forms a fastening section of the sealing element, the molded-on connection to the cover strip is preferably established via an elastomer part of the section.

The cover strip preferably consists of a metal, for example of aluminum or chromium. It can also be a galvanized plastic part here.

One particularly preferred method step consists in that the cover strip is arranged in a mold chamber of a mold in the heated state, in such a way that the shrinkage of the cover strip up to the cooling to approximately ambient temperature is aligned with the shrinkage of the injection molded section of the sealing element. In this way, advantageously neither stresses nor fractures of the material which is molded onto the cover strip occur.

BRIEF DESCRIPTION OF THE DRAWING

In the following text, the invention is described further using exemplary embodiments and the appended drawings which relate to said exemplary embodiments and in which.

DETAILED DESCRIPTION OF THE INVENTION

Figure 1:
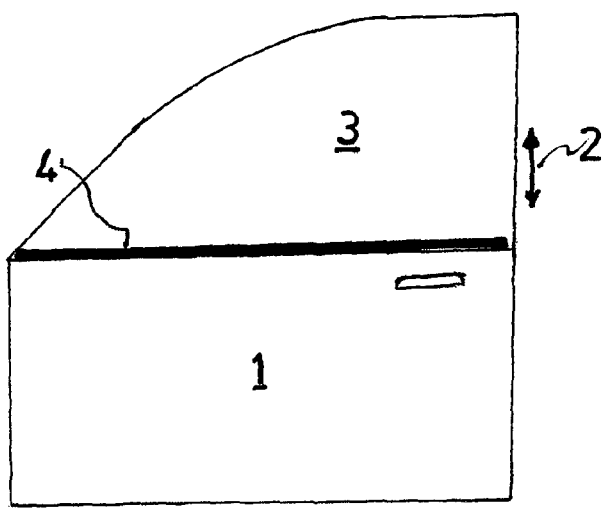
FIG. 1 shows a sealing element according to the invention for sealing a lowerable vehicle window pane on a window shaft.
Figure 2:
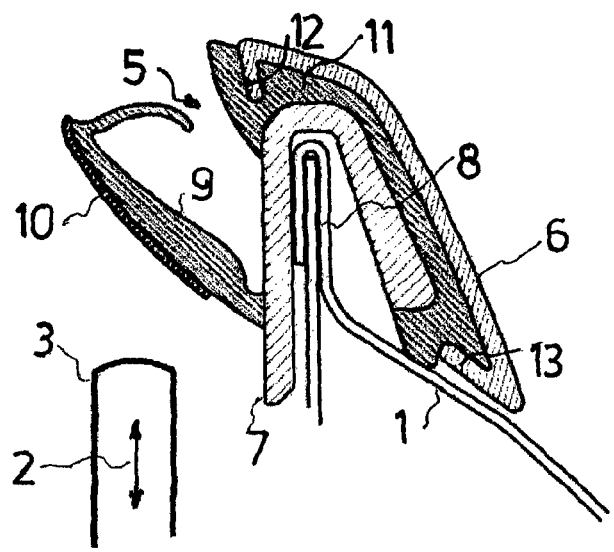
FIG. 2 shows a sealing element in accordance with the invention 1 in a cross-sectional view.

A sealing element 4 which is shown in cross section in FIG. 2 is arranged at a shaft opening on a vehicle door 1 with a window pane 3 which can be lowered into the shaft in accordance with arrow 2.

The strand-shaped sealing element 4 comprises an injection molded section 5 which is molded onto a metallic cover strip 6. The cover strip 6 consists of aluminum in the example which is shown.

The injection molded section 5 is manufactured as a composite part from a thermoplastic (polypropylene (PP) in the example which is shown) and an elastomer (a thermoplastic elastomer (TPE) in the present case).

A part 7 of the section 5, which part 7 consists of thermoplastic, forms a fastening section for plugging onto a vehicle body flange 8 which is formed on the vehicle door 1. An elastomer part 9 which projects from the thermoplastic part 7 forms a sealing tongue which bears via a sliding layer 10 against the window pane 3. A further elastomer part 11 of the section 5 is molded onto the cover strip 6, the thermoplastic part 7 of the section 5 in turn being molded onto the further elastomer part 11.

Figure 3:
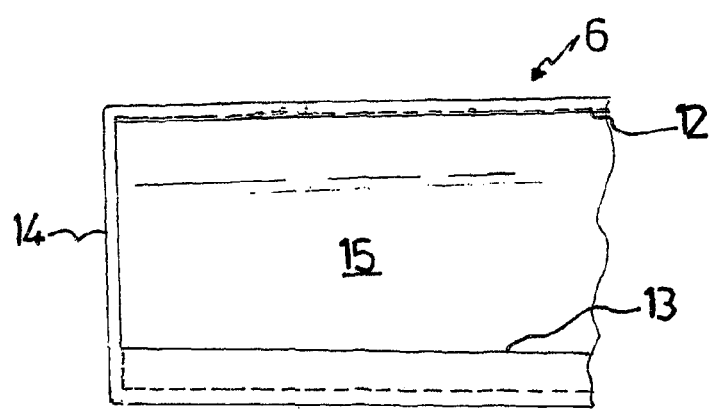
FIG. 3 shows a detailed view of a cover strip which can be used in a sealing strand according to the invention.

On its longitudinal edges, the cover strip 6 has in each case one angled-away portion 12 and 13. End walk are formed at the two ends of the cover strip 6, of which end walk the end wall 14 is visible in FIG. 3. The angled-away portions 12 and 13 and the end walls 14 form an undercut vessel space 15 which is filled by way of the molded-on elastomer material of the elastomer part 11.

In order to manufacture the sealing strand 3, the cover strip 6 is arranged in a mold chamber of an injection molding die, and the elastomer part 11 of the section 5 which is to be manufactured by way of injection molding is produced in a first injection molding work operation.

Before the introduction into the mold chamber, the cover strip 6 is heated to a temperature between 100 and 250° C., with the result that it is arranged in the mold chamber in a thermally expanded state. As the cover strip 6 and the elastomer part 11 which is cast onto it cool to approximately room temperature, the cover strip 6 therefore shrinks to the same extent as the elastomer part 11. Stresses and material fractures as a result of different shrinkage are avoided. The cover strip 6 and the elastomer part 11 form a stable composite part. A fixed connection between the elastomer part 11 and the cover strip 6 results firstly by way of the molding of the elastomer material onto the aluminum of the composite strip. Secondly, the positively locking engagement of the elastomer part 11 into the undercut vessel space 15 of the cover strip 6 ensures a stable bond.

The composite part which is formed from the elastomer part 11 and the cover strip 6 is then arranged in a mold chamber, and the thermoplastic part 7 of the section 5 which is to be manufactured by way of injection molding is produced in a further injection molding work operation. Finally, the elastomer part 9 which forms the sealing tongue is manufactured in a third injection molding work operation.

It goes without saying that sealing elements which comprise a cover strip might also be used at other locations of a vehicle body than the window shaft which is shown here, for example also on a stationary vehicle window pane.

The invention claimed is:

1. A sealing element for sealing a vehicle window pane which can be lowered into a shaft, comprising: a metal or galvanized plastic cover strip having a stable shape; and an injection molded section connected to the metal or galvanized plastic cover strip by being molded onto the metal or galvanized plastic cover strip, wherein the metal or galvanized plastic cover strip has longitudinal ends with end walls.

2. The sealing element according to claim 1, wherein the metal or galvanized plastic cover strip has a vessel-shaped configuration with a vessel space filled by way of molding material of the section, wherein the end walls delimit the vessel space.

3. The sealing element according to claim 2, wherein the vessel space is undercut.

4. The sealing element according to claim 1, wherein the injection molded section is a composite part from a thermoplastic and an elastomer.

5. The sealing element according to claim 4, wherein the composite part includes a thermoplastic elastomer.

6. The sealing element according to claim 4, wherein the elastomer provides the connection between the section and the metal or galvanized plastic cover strip.

7. The sealing element according to claim 4, further comprising a fastening section made up of the thermoplastic of the section.

8. The sealing element according to claim 1, wherein the metal is aluminum or chromium.

9. A method for manufacturing a sealing element that includes a metal or galvanized plastic cover strip having a stable shape and ends with end walls, comprising the steps of: arranging the metal or galvanized plastic cover strip or a reinforcing insert in a mold chamber; and connecting the metal or galvanized plastic cover strip or the reinforcing insert to a section of the sealing element by molding on during manufacturing of the section by injection molding material of the sealing element into the metal or galvanized plastic cover strip or a reinforcing insert up to the end walls.

10. The method according to claim 9, including arranging the metal or galvanized plastic cover strip in the mold chamber in a heated state so that shrinkage of the metal or galvanized plastic cover strip during to cooling to ambient temperature matches shrinkage of the injection molded section.

11. The method according to claim 10, including preheating the metal or galvanized plastic cover strip to from 100 to 250° C.

* * * * *